United States Patent
Dasar et al.

(10) Patent No.: US 9,886,580 B2
(45) Date of Patent: Feb. 6, 2018

(54) METHOD FOR OPTIMIZING BOOT TIME OF AN INFORMATION HANDLING SYSTEM

(71) Applicant: DELL PRODUCTS, L.P., Round Rock, TX (US)

(72) Inventors: Sundar Dasar, Round Rock, TX (US); Yogesh P. Kulkarni, Round Rock, TX (US); Sumanth Vidyadhara, Bangalore (IN); Bill Munger, Round Rock, TX (US); Raghavendra Venkataramudu, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 184 days.

(21) Appl. No.: 14/580,389

(22) Filed: Dec. 23, 2014

(65) Prior Publication Data

US 2016/0180094 A1 Jun. 23, 2016

(51) Int. Cl.
*H04L 29/06* (2006.01)
*G06F 21/00* (2013.01)
*G06F 21/57* (2013.01)
*G06F 9/44* (2006.01)
*G06F 11/14* (2006.01)

(52) U.S. Cl.
CPC .......... *G06F 21/575* (2013.01); *G06F 9/4403* (2013.01); *G06F 9/4406* (2013.01); *G06F 11/1417* (2013.01); *G06F 11/1438* (2013.01)

(58) Field of Classification Search
CPC ............... G06F 21/575; G06F 11/1417; G06F 11/1438; G06F 9/4403; G06F 9/4406
See application file for complete search history.

(56) References Cited

U.S. PATENT DOCUMENTS

| | | | | |
|---|---|---|---|---|
| 2009/0327741 | A1* | 12/2009 | Zimmer | G06F 21/575 713/183 |
| 2014/0365755 | A1* | 12/2014 | Liu | G06F 21/572 713/2 |
| 2015/0193620 | A1* | 7/2015 | Khatri | G06F 21/575 713/2 |

FOREIGN PATENT DOCUMENTS

EP 2141625 A2 * 1/2010 ........... G06F 21/575

OTHER PUBLICATIONS

George Bricker; "Unified extensible firmware interface (UEFI) and secure boot: promise and pitfalls"; Oct. 2013; Journal of Computing Sciences in Colleges: vol. 29 Issue 1, Publisher: Consortium for Computing Sciences in Colleges; pp. 60-63.*

* cited by examiner

*Primary Examiner* — Shewaye Gelagay
*Assistant Examiner* — Courtney Fields
(74) *Attorney, Agent, or Firm* — Isidore PLLC

(57) ABSTRACT

A method and information handling system (IHS) that optimizes boot time. The method includes a basic input output system (BIOS) performing an authentication check of drivers during an initial boot process. The results of the authentication check are stored along with an unified extensible firmware interface (UEFI) image for each driver in an authentication results data structure (ARDS). In response to receipt of a subsequent request to enable a secure boot of the IHS, when the initial boot process was performed with the secure boot disabled, the ARDS is accessed to determine if any of the drivers failed the authentication check. When none of the drivers have failed the authentication check, the boot process is continued using the UEFI images of the drivers. When at least one of the drivers has failed its authentication check, a notification is output indicating a failure of the authentication check.

19 Claims, 7 Drawing Sheets

METHOD FOR OPTIMIZING BOOT TIME OF AN INFORMATION HANDLING SYSTEM

BACKGROUND

1. Technical Field

The present disclosure generally relates to initiating operations in an information handling system and in particular to optimizing boot time during start-up in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems use basic input-output system (BIOS)/unified extensible firmware interface (UEFI) firmware/software to initialize and test the system hardware components and to load an operating system. The BIOS/UEFI provides an abstraction layer for the hardware to allow application programs and operating systems to interact with the keyboard, display, and other input/output devices. The BIOS/UEFI firmware/software is stored in a non-volatile memory device such as a flash memory device and is designed to work with a particular model of computer.

A secure boot policy is a security method that insures that an information handling system uses only trusted firmware/software in the booting operation. During start-up of the information handling system, the firmware checks the signature of each piece of boot software, including firmware, software and the operating system. If the signatures are good, the information handling system boots and the firmware gives control to the operating system.

With a conventional boot operation, a reboot of the information handling system is automatically triggered whenever a secure boot policy is changed during the boot device selection phase of the boot process. A system reboot is required to check the integrity of all the BIOS/UEFI images or drivers in the driver execution phase using the secure boot policy. This integrity check causes a significant delay in booting the information handling system and also in the operating system launch time.

BRIEF SUMMARY

Disclosed are a computer-implemented method and an information handling system for optimizing boot time during start-up of an information handling system.

According to one embodiment, the method includes a basic input output system (BIOS) dynamically performing an authentication check of drivers within the information handling system (IHS) during an initial boot process of the IHS. An authentication results data structure (ARDS) stores an identification of a unified extensible firmware interface (UEFI) image for each driver that is checked, along with a result of the authentication check associated with that driver. In response to receipt of a subsequent request to enable a secure boot of the IHS when the initial boot process was performed with the secure boot disabled, the ARDS is accessed to determine if any of the drivers failed its authentication check. When none of the drivers has failed the authentication check, the boot process is automatically continued using the UEFI images of the drivers. When at least one of the drivers has failed the authentication check, a notification is outputted indicating a failure of the authentication check by the at least one driver.

Also disclosed is an information handling system (IHS) that comprises a processor and a memory coupled to the processor via a system interconnect. The processor has firmware executing thereon to enable the IHS to optimize boot time during start-up. The firmware configures the processor to dynamically perform an authentication check of drivers within the IHS during an initial boot process of the IHS via a basic input output system (BIOS). An authentication results data structure (ARDS) stores an identification of a unified extensible firmware interface (UEFI) image for each driver that is checked, along with a result of the authentication check associated with that driver. In response to receipt of a subsequent request to enable a secure boot of the IHS, when the initial boot process was performed with the secure boot disabled, the ARDS is accessed to determine if any of the drivers have failed its authentication check. When none of the drivers has failed the authentication check, the initial boot process continues using the UEFI images of the drivers. When at least one of the drivers has failed the authentication check, a notification is outputted indicating a failure of the authentication check by at least one driver.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide an information handling system (IHS) and a method performed within the information handling system for optimizing boot time during start-up of the information handling system.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
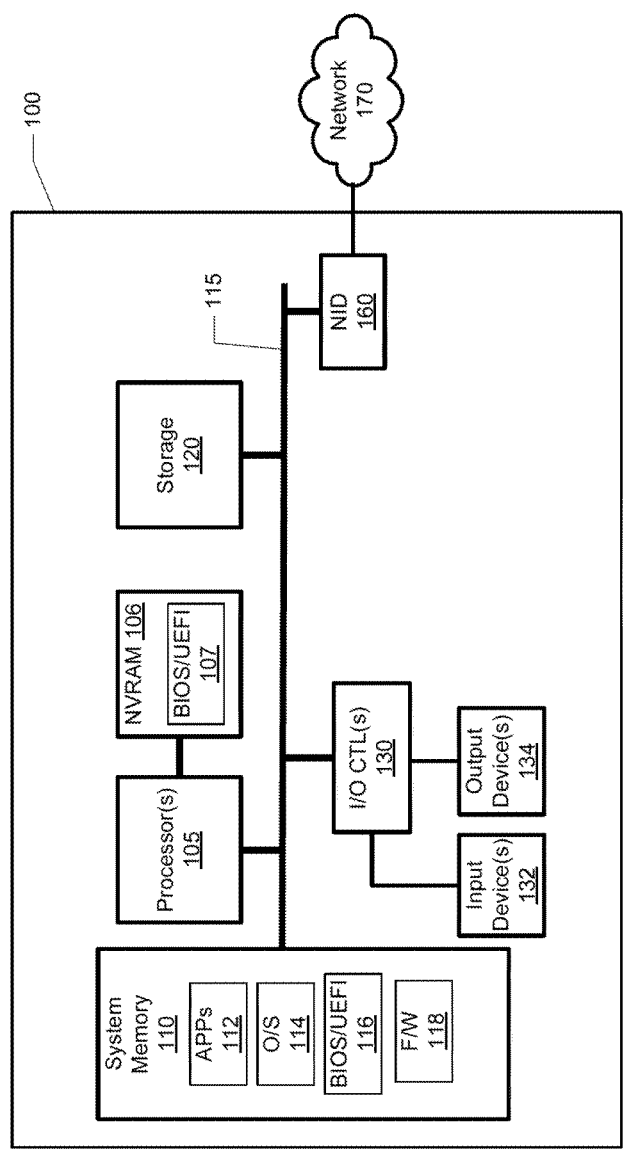
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to non-volatile memory such as non-volatile random access memory (NVRAM) 106. NVRAM 106 stores basic input/output system/unified extensible firmware interface (BIOS/UEFI) drivers or images 107. In one or more embodiments, BIOS/UEFI image 107 comprises the additional functionality associated with unified extensible firmware interface and can include UEFI images and drivers.

Processor(s) 105 are also coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be hard drive or a solid state drive. The one or more software and/or firmware modules within storage 120 can be loaded into system memory 110 during operation of IHS 100. As shown, system memory 110 can include therein a plurality of software and/or firmware modules including application(s) 112, operating system (O/S) 114, BIOS/UEFI 116 and firmware (F/W) 118. The various software and/or firmware modules have varying functionality when their corresponding program code is executed by processor(s) 105 or other processing devices within IHS 100. During boot-up or booting operations of IHS 100, processor 105 selectively loads at least BIOS/UEFI driver or image 107 from NVRAM 106 to system memory 110 to be stored as BIOS/UEFI 116.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s).

IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprises multiple devices located across a distributed network, and NID 160 enables IHS 100 to be connected to these other devices. Network 170 can be a local area network, wide area network, personal area network, and the like, and the connection to and/or between network and IHS 100 can be wired or wireless or a combination thereof. For purposes of discussion, Network 170 is indicated as a single collective component for simplicity. However, it is appreciated that network 170 can comprise one or more direct connections to other devices as well as a more complex set of interconnections as can exist within a wide area network, such as the Internet.

Figure 2A:
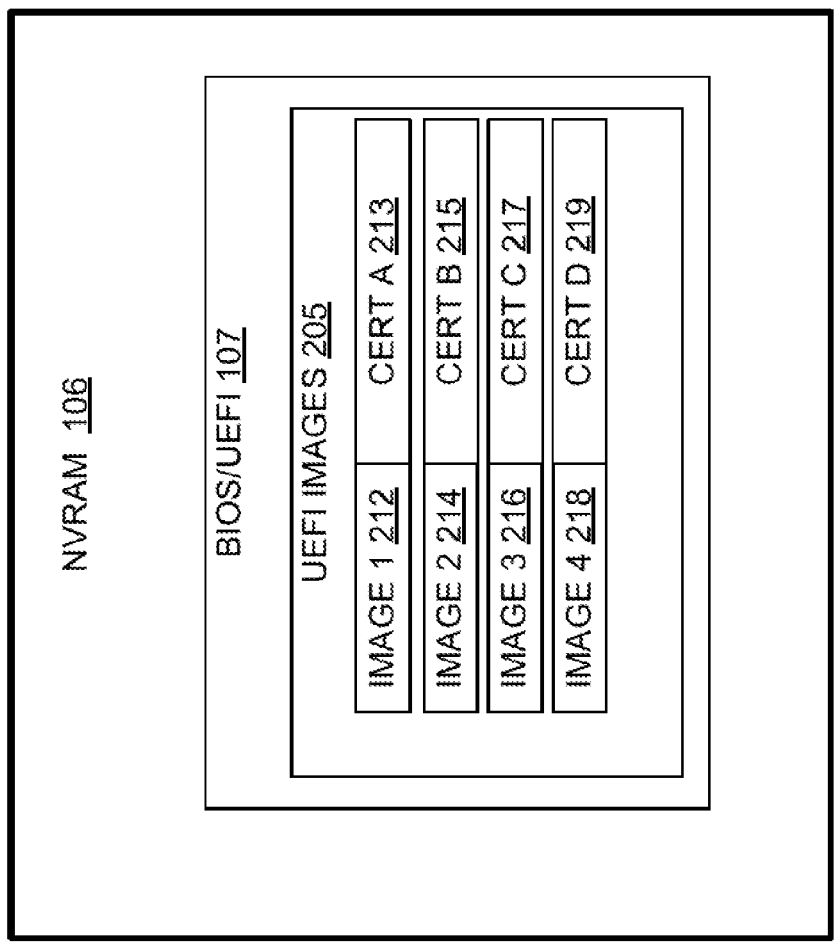
FIG. 2A illustrates example contents of a non-volatile random access memory of the example information handling system, in accordance with one embodiment.

With reference now to FIG. 2A, one embodiment of example contents of NVRAM 106 is shown. NVRAM 106 stores BIOS/UEFI images 107. BIOS/UEFI images 107 include one or more files of UEFI images 205. UEFI images 205 includes image 1 212, image 2 214, image 3 216 and image 4 218. Each UEFI image includes an associated digital security certificate or signature. Image 1 212 has a certificate (CERT) A 213, image 2 214 has a CERT B 215, image 3 216 has a CERT C 217 and image 4 218 has a CERT D 219. It is appreciated that in some implementations, one or more of the UEFI images may not have a digital security certificate or may have one that is corrupted or unrecognizable, and would thus not be authenticated or verified during the processes described herein. It is further appreciated that the number of UEFI images in a particular IHS can vary, and the use of only four such images is for illustration only.

Figure 2B:
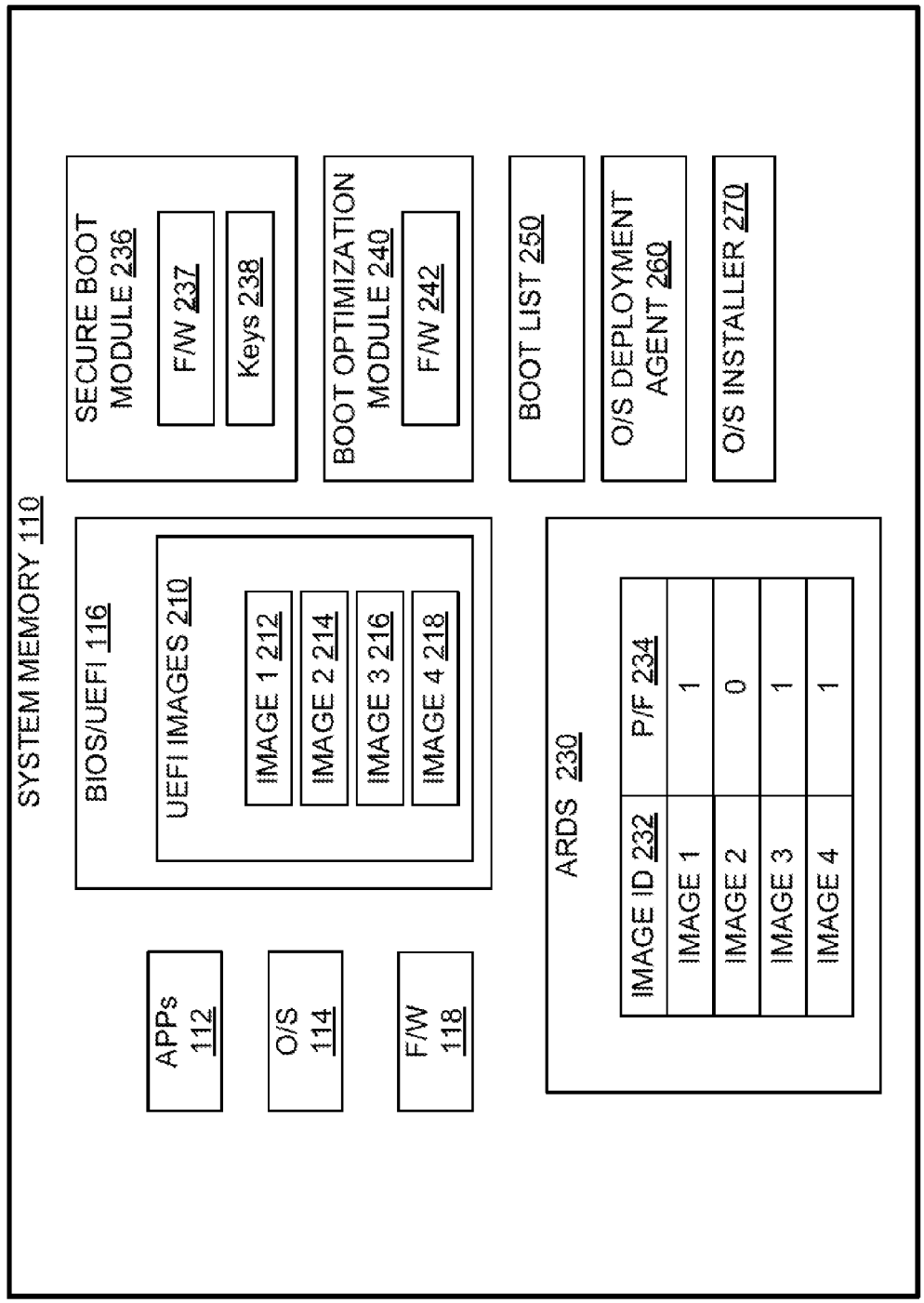
FIG. 2B illustrates example contents of a system memory of the example information handling system, in accordance with one embodiment.

With reference now to FIG. 2B, one embodiment of example contents of system memory 110 is shown. System memory 110 stores software and/or firmware modules including application(s) 112, operating system (O/S) 114, BIOS/UEFI 116 and firmware (F/W) 118. BIOS/UEFI 116 includes one or more files of loaded UEFI drivers or images 210. In the illustrated example, the loaded UEFI images 210 includes image 1 212, image 2 214, image 3 216 and image 4 218.

Secure boot module 236 is a software and/or firmware module that secures the boot process by preventing the loading of UEFI images 205 that are not signed with an acceptable digital signature or certificate. Secure boot module 236 includes firmware (F/W) 237. The boot process is initially placed in "setup" mode, which allows one or more keys 232 to be written to the firmware. Once keys are written, secure boot enters "User" mode, where only the owner of the keys can modify the keys. During a secure boot of the IHS 100, the secure boot firmware 237 uses the keys 238 to authenticate UEFI images 205. Only UEFI images 205 signed with an acceptable key can be loaded by the firmware to system memory 110.

System memory 110 further includes authentication results data structure (ARDS) 230. ARDS 230 stores an image identification 232 of the UEFI image for each driver that is checked, along with a pass/fail result 234 of the authentication check associated with that driver. In one embodiment, image identification 232 can be a hash value calculated using the contents of each image and whether that image passed or failed authentication. Example hash algorithms for hashes include secure hash algorithm SHA-256. Other identification techniques can include globally unique identifiers (GUIDs), human-readable image names, or UEFI device paths.

Within the illustrative embodiment, a "1" in pass/fail result 234 indicates that the driver has passed the authentication check. A "0" in pass/fail result 234 indicates that the driver has failed the authentication check. In FIG. 2B, ARDS 230 indicates that images 1, 3 and 4 have passed authentication and image 2 has failed authentication. In another embodiment, ARDS 230 can include two separate lists of drivers, with one list including drivers that have passed authentication and another list including drivers that have failed authentication.

With the described embodiments, the IHS is capable of being booted up in one of at least two modes, including secure boot enabled mode and secure boot disabled mode. Also, in one or more embodiments, the IHS can further be configured by the user to boot up using an optimized secure boot mode or a non-optimized secure boot mode. The user or firmware can configure the IHS to automatically boot up in a particular default or preset boot mode (e.g., with secure boot disabled). The firmware then enables the user to change from the default/preset mode during the boot process. The user of the IHS can then trigger (via entry of specific user inputs) a change in the boot mode from secure to non-secure and vice-versa during the boot process.

Returning to FIG. 2B, secure boot module 236 includes F/W 237 that optimizes boot time during start-up of IHS 100. During an initial boot process of the IHS, secure boot module 236 dynamically performs an authentication check of UEFI images 212-218 within IHS 100. As one aspect of the disclosure, this initial authentication check is performed regardless of the particular mode (i.e., secure boot enabled versus secure boot disabled) in which the IHS is being booted up, including when the initial boot process is performed with the secure boot disabled. In response to receipt of a subsequent request to enable a secure boot of IHS 100, the ARDS 230 is accessed to determine if any of the drivers failed its authentication check (which was previously completed during the initial boot process). In this context, enabling the secure boot assumes that the initial boot process was performed with the secure boot disabled. The process of checking the ARDS 230 for authentication check failures is automatically performed (i.e., without any user input or trigger) when the initial boot process occurs with the system set to the secure boot enabled mode. When none of the drivers have failed the authentication check, the initial boot process is continued using the UEFI images 212-218 of the drivers. When at least one of the drivers or images (e.g. image 214) has failed the authentication check, a notification is outputted indicating a failure of the authentication check by at least one driver.

Boot optimization module 240 includes firmware (F/W) 242 that further optimizes boot time during start-up of IHS 100. Boot optimization module 240 checks whether a boot up mode of IHS 100 is set to an optimized boot mode. When the IHS is set to the optimized boot mode, only UEFI images required for operating system (OS) deployment are authenticated and loaded. The UEFI images required for operating system (OS) deployment are contained in boot list 250. During the authentication check and storing of UEFI images to ARDS 230, boot optimization module 240 selectively performs the authentication check on only those identified UEFI images required for OS deployment (e.g. contained in boot list 250) and stores only the identification and associated result of the authentication check of the identified UEFI images within the ARDS 230.

System memory 110 also includes OS deployment agent 260 and OS installer 270. OS deployment agent 260 performs functions required prior to the start of OS installer 270. OS installer 270 installs OS 114 for IHS 100.

Those of ordinary skill in the art will appreciate that the hardware and software/firmware components and basic configuration depicted in FIGS. 1 and 2 and described herein may vary. For example, the illustrative components within IHS 100 (FIG. 1) are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

Figure 3:
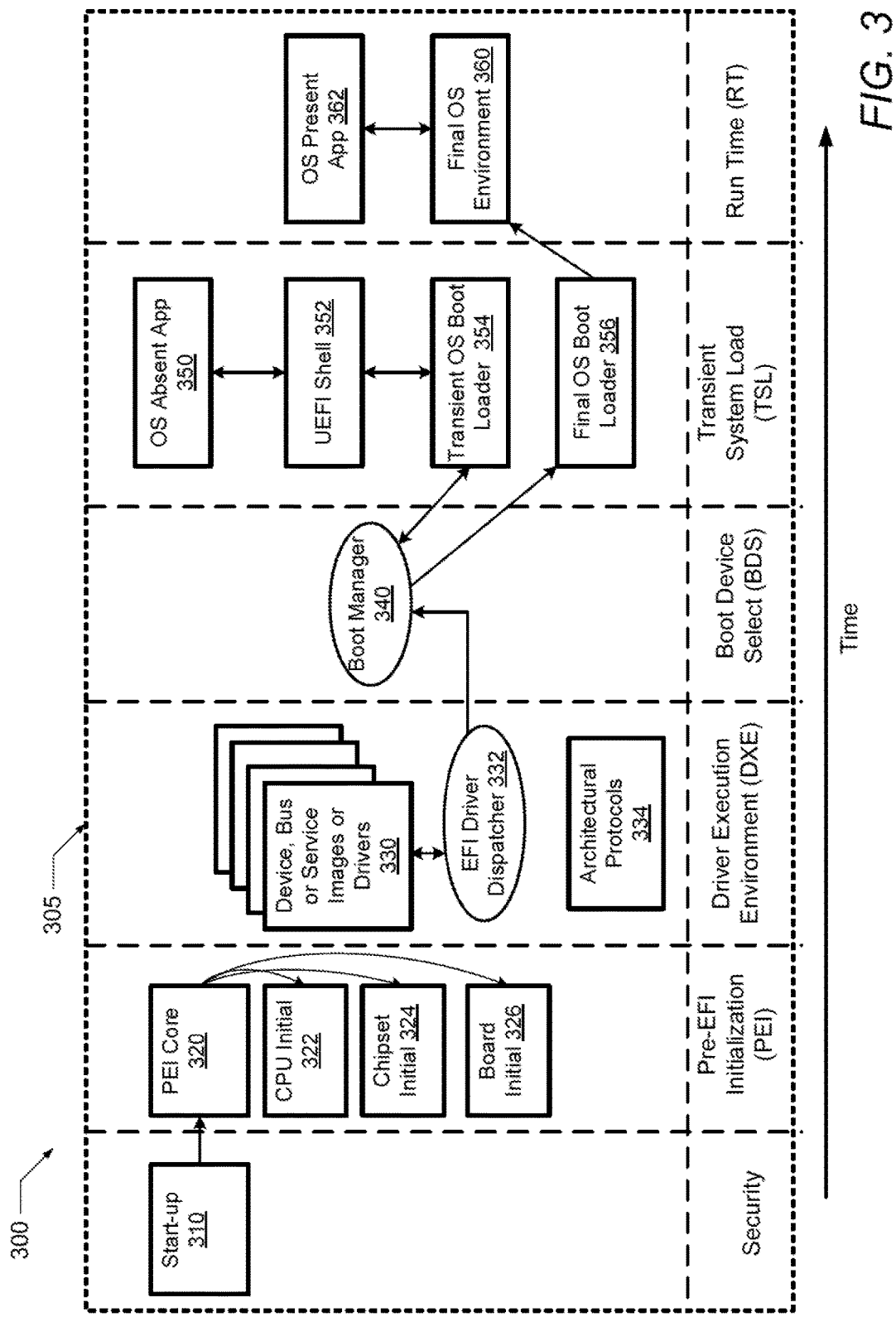
FIG. 3 is a timeline of a boot-up operation or process for an information handling system, in accordance with one embodiment.

FIG. 3 illustrates a timeline 300 of a boot operation or process 305 for IHS 100. In the description of FIG. 3, reference is also made the specific components illustrated within the preceding FIGS. 1-2. Timeline 300 begins at start-up 310, which involves a security phase, where processor 105 is started. At a pre-extensible firmware interface initialization (PEI) phase, a PEI core operation 320 is performed. During the PEI core operation 320, memory is initialized and firmware volume locations are described in hand off blocks. Next, a CPU initialization 322 of processor 105 occurs, followed by chipset initialization 324 and then motherboard initialization 326. At a driver execution environment (DXE) phase, EFI driver dispatcher 332 retrieves device, bus or service images or drivers 330 depending upon the architectural protocols 334 associated with IHS 100. During the DXE phase, if a secure boot mode is enabled, an authentication check of UEFI images 330 occurs. If the secure boot mode is not enabled, an authentication check of UEFI images 330 does not occur during the DXE phase.

EFI driver dispatcher 332 transmits device, bus or service images or drivers 330 to boot manager 340 during the boot device selection (BDS) phase. In one embodiment of the present invention, the user is given an option to enter the secure boot mode prior to entering the BDS phase. In another embodiment of the present invention, the user is given an option to enter an optimized boot mode prior to entering the BDS phase of the booting process 305.

At the transient system load (TSL) phase, either transient OS boot loader 354 or final OS boot loader 356 loads device, bus or service images or drivers 330 to start OS 114. If transient OS boot loader 354 is selected to run, then IHS 100 enters a UEFI shell environment 352 and triggers OS absent application 350 to run. If final OS boot loader 356 is selected to run, IHS 100 loads the OS 114, enters the final OS environment 360, and triggers OS present application 362 to run during the run time phase.

Figure 4A:
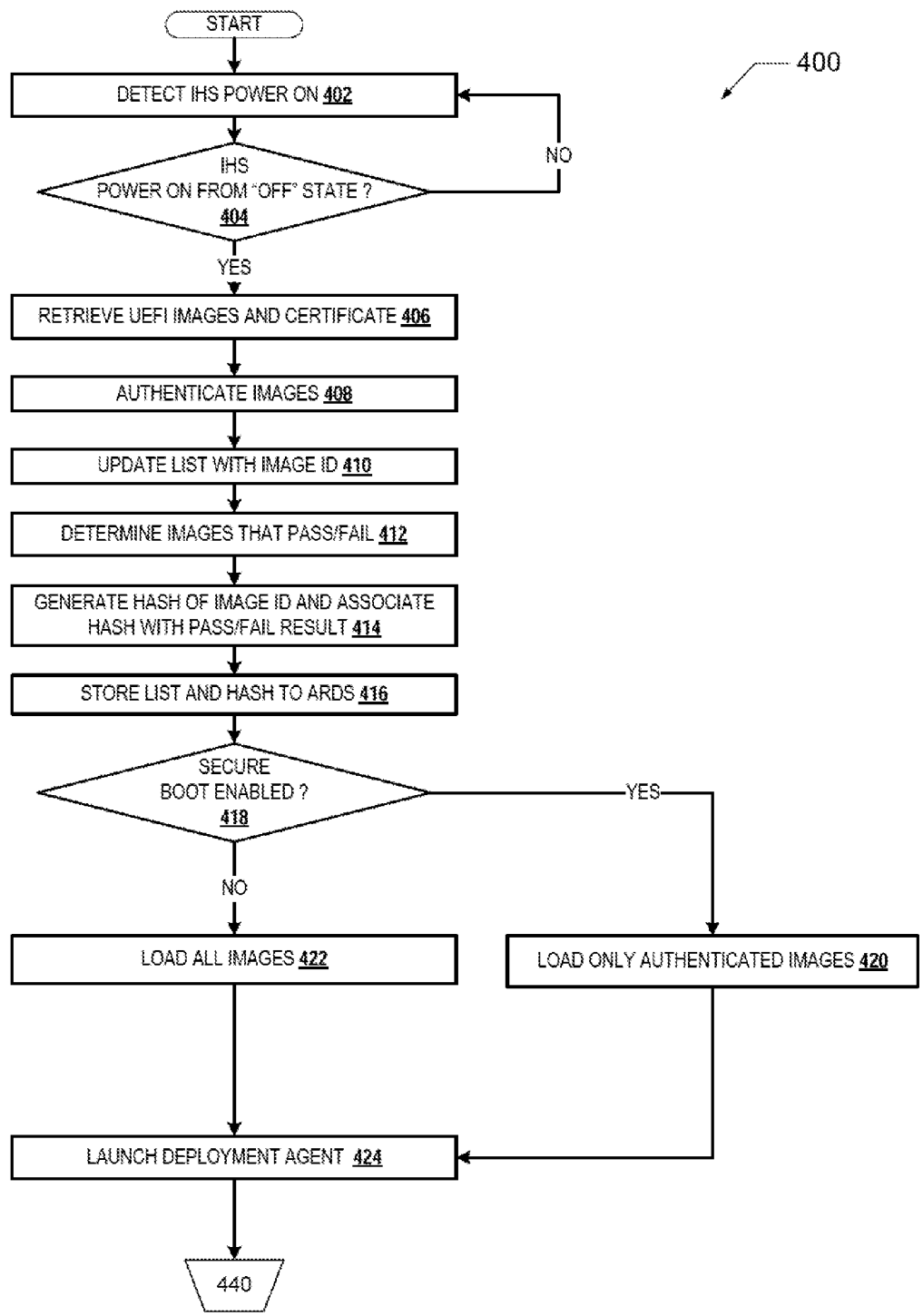
FIGS. 4A-B is a flow chart illustrating one example of a method for optimizing boot time during start-up in an information handling system according to one or more embodiments.
Figure 4B:
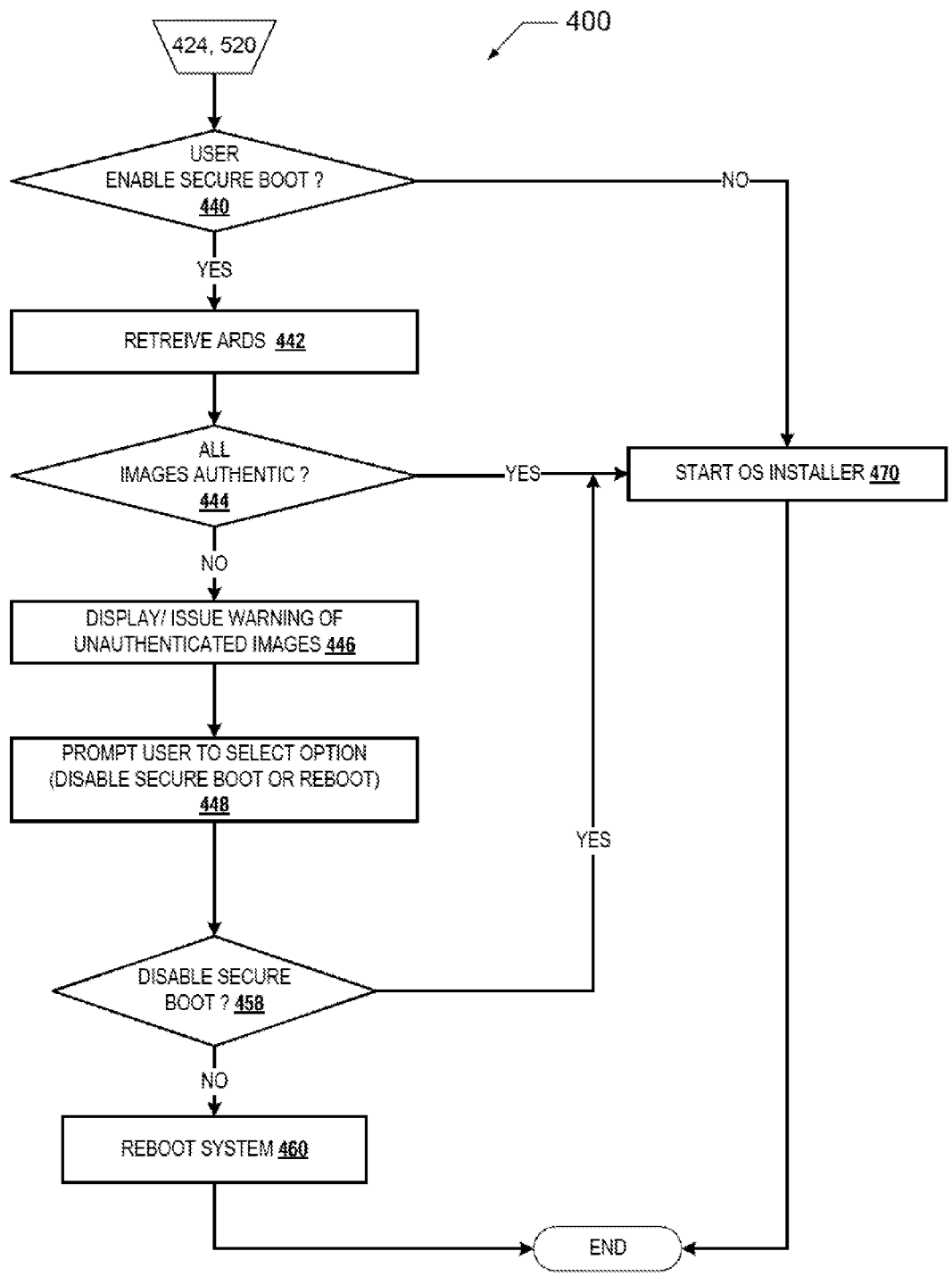
Figure 5:
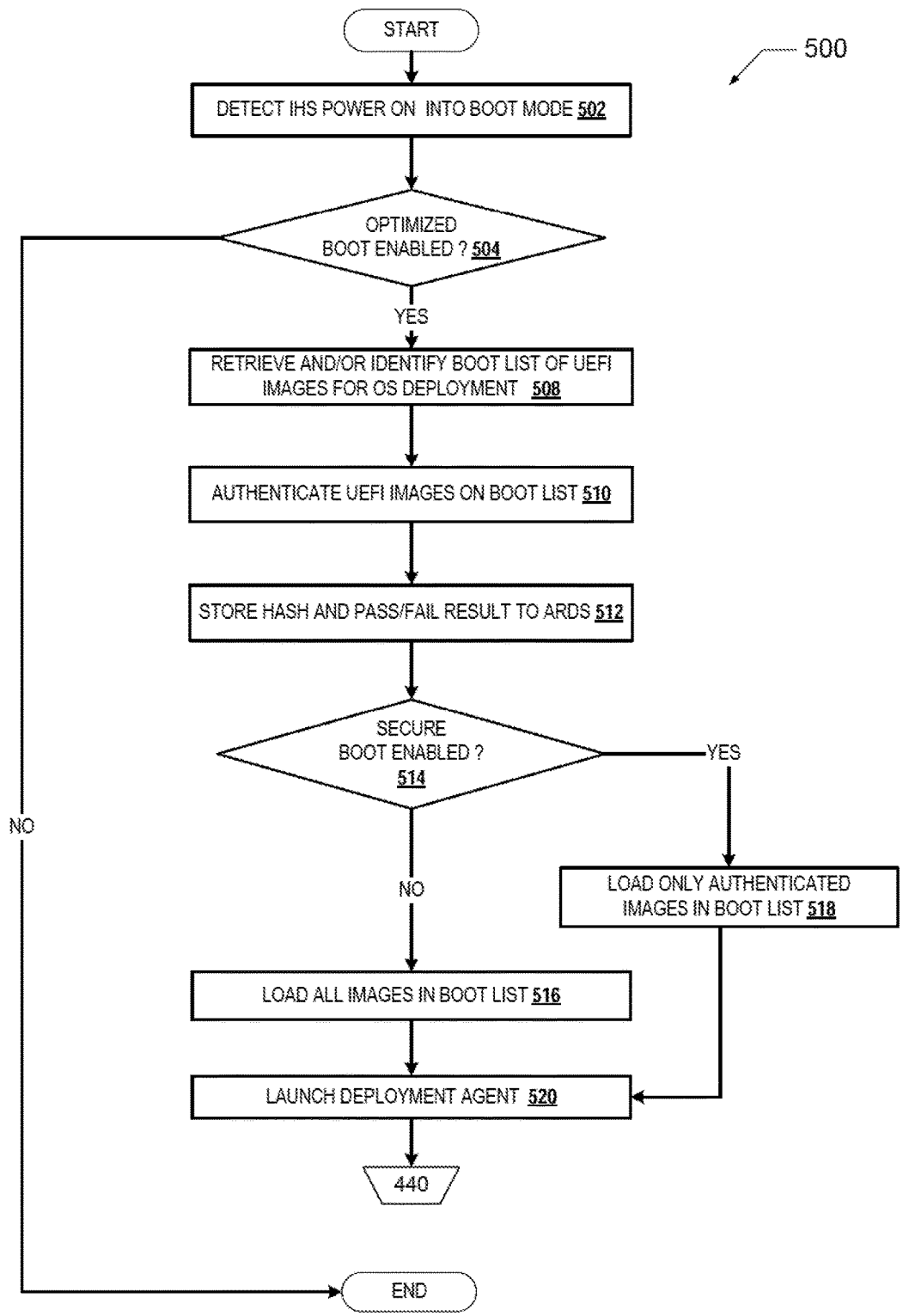
FIG. 5 is a flow chart illustrating another example of a method for optimizing boot time during start-up in an information handling system according to one or more embodiments.

FIGS. 4A-B and 5 illustrate flowcharts of exemplary methods 400 and 500 by which processor 105 within the preceding figures performs different aspects of the processes that enable the one or more embodiments of the disclosure. Generally, methods 400 and 500 represent computer-implemented methods for optimizing boot time during start-up in an information handling system. The description of methods 400 and 500 are provided with general reference to the specific components illustrated within the preceding FIGS. 1-3. Generally methods 400 and 500 are described as being implemented via processor 105 and particularly the execution of code provided by and F/W 237 of secure boot module 236 and F/W 242 of boot optimization module 240 acting within processor 105. It is however appreciated that certain aspects of the described methods may be implemented via other processing devices and/or execution of other code.

More specifically, the following flowcharts of FIGS. 4A-B and 5 disclose specific functionality provided by secure boot module 236 and specifically by the execution of F/W 237 within processor 105 related to optimizing boot time during start-up in IHS 100. According to one embodiment, F/W 237 includes program code that configures the processor 105 to provide the various functions described within the present disclosure. Specifically, the F/W 237 configures the processor 105 to dynamically perform an authentication check of UEFI images 212-218 within IHS 100 during each initial boot process of the IHS. The authentication check results in an identification 232 of a unified extensible firmware interface (UEFI) image for each driver that is checked, along with a result of the authentication check (e.g. P/F 234) associated with that driver. The results of the authentication check are stored in ARDS 230.

In response to receipt of a subsequent request to enable a secure boot of IHS 100, particularly when the initial boot process was performed with the secure boot disabled, the ARDS 230 is accessed to determine if any of the drivers failed its authentication check. The subsequent request includes a user input received during the boot phase and which sets the IHS to secure boot mode (versus unsecured boot mode). When none of the drivers have failed the authentication check, the boot process is continued using the UEFI images 212-218 of the drivers. When at least one of the drivers or images (e.g. image 3) has failed the authentication check, a notification is output indicating a failure of the authentication check by the at least one of the drivers.

Referring now to the flow charts and specifically to FIG. 4A, method 400 begins at the start block and proceeds to block 402 where processor 105 detects that IHS 100 has been powered on such that the processor and other functional components receive a full complement of power required to operate. The powering on of the IHS to an operational state can occur from one of at least two possible non-operational states. In at least one embodiment, the IHS 100 can be booted up entirely from an off state, in which a start-up and authentication protocol is required to load the operating system before the IHS can function. Alternatively, the IHS 100 can be activated from a low power state, such as a sleep or hibernation state, in which the previously authenticated operating system is re-activated without requiring another authentication process. At decision block 404, processor 105 determines if the powering on of IHS 100 involved powering on (i.e., providing system power to the components of IHS 100) from an off state. In response to IHS 100 not being powered on from an off state (i.e., power on from a low power state that does not require reloading and re-authentication of the OS), method 400 returns to block 402 to continue detecting a power on condition that occurs from an off state of the IHS 100.

In response to IHS 100 being powered on from an off state, processor 105 retrieves a first unified extensible firmware interface (UEFI) image 1 212 and security certificate A 213 from BIOS/UEFI images 205 stored in NVRAM 106 (block 406). Keys 232 are used to determine if the certification A 213 passes authentication. The retrieval of the first unified extensible firmware interface (UEFI) image 1 212 marks the beginning of the device execution environment (DXE) phase of the booting process 305.

Processor 105 performs an authentication check of UEFI 1 image 212 via certificate A 213 and performs a similar authentication check of each other UEFI image (or driver) using that image's certificate (block 408). Following each authentication check and/or as a result of the authentication check, processor 105 updates a list of identifiers 232 of UEFI images for each driver that is checked (block 410), and processor also records the results of the authentication check within an entry of the list (e.g. P/F 234) associated with that driver (block 412). In one embodiment, processor 105 generates a hash identifying the UEFI image and associates the result of the authentication check for the driver with the hash (block 414). The hash and corresponding results of the authentication check for each UEFI image are stored in ARDS 230 (block 416).

Processor 105 determines if a secure boot mode ensuring that all images are authenticated prior to loading the OS, is enabled (decision block 418). In response to the secure boot mode being enabled, processor 105 loads only authenticated images in ARDS 230 to UEFI images 210 of system memory 110 (block 420). Processor 105 triggers OS deployment agent 260 to initiate loading of the OS in secure mode (block 424) and determines if a user has enabled a secure boot mode (block 440) (FIG. 4B).

In response to the secure boot mode not being enabled, processor 105 loads all of the images in ARDS 230 to UEFI images 210 of system memory 110 (block 422). Processor 105 triggers OS deployment agent 260 to initiate loading of the OS (block 424) and determines if a user has enabled a secure boot mode (block 440) (FIG. 4B). The boot device selection (BDS) phase of the booting process 305 includes selecting one or more boot options such as a secure boot mode.

Turning to FIG. 4B, method 400 continues. At decision block 440, processor 105 determines if a user has selected or requested to enable the secure boot mode (decision block 440). In response to not receiving any user input or selection to enable the secure boot mode prior to completion of the initial boot phase, i.e., with the IHS remaining in the unsecured boot mode, processor 105 starts OS installer 270 to complete installation of OS 114 in the unsecured mode (block 470). Method 400 then terminates.

In response to receipt of a user selection to enable the secure boot mode prior to expiration of a time period during which such inputs can be received, processor 105 retrieves ARDS 230 (block 442) and determines if any of the UEFI image or driver identifiers 232 has an associated result that indicates a failed authentication check (decision block 444). In response to none of the UEFI images or drivers failing the authentication check (e.g. all UEFI images are authentic), processor 105 starts OS installer 270 (block 470) to complete installation of OS 114. Method 400 then terminates.

In response to at least one of the UEFI images or drivers failing the authentication check at decision block 444, processor 105 displays and/or issues a warning or notice of the failure of the authentication check (block 446). In at least one embodiment, processor 105 also displays the names of the UEFI images among the UEFI image IDs 232 that are not authentic (e.g. P/F is "0"). Processor 105 prompts a user to select an option from among a plurality of possible options, including, but not limited to, disabling secure boot mode and proceeding with an un-secured boot mode or re-starting the boot process (block 448).

Processor 105 determines if the received user selection is to disable the secure boot mode (block 458). In response to receiving a user selection to disable the secure boot mode, processor 105 starts OS installer 270 (block 470) to complete installation of OS 114 in a non-secured boot environment. Method 400 then terminates. In response to a user selecting not to disable the secure boot module 236, processor 105 triggers IHS 100 to reboot (block 460). Method 400 then ends.

Turning now to FIG. 5, method 500 begins at the start block and proceeds to block 502 where processor 105 detects the powering on of the IHS into a boot mode, i.e., from a powered off state. Processor 105 determines if boot optimization mode, which provides an optimized boot sequence, is enabled (decision block 504). In response to the boot optimization mode not being enabled, method 500 terminates and the boot will perform an authentication of all of the UEFI images, similarly to the process previously described in FIG. 4A. In response to the boot optimization mode being enabled, processor 105 retrieves and/or identifies a boot list of UEFI images required for operating system (OS) deployment, i.e., those UEFI images that are included in boot list 250 (block 508). This boot list 250 of UEFI images is a condensed list that does not include all of the UEFI images within the IHS.

With the boot list 250 identified, processor 105 triggers secure boot module 236 to selectively perform authentication checks of each of the UEFI images within the boot list 250 (block 510). Processor 105 then stores the hash and corresponding pass/fail result to the ARDS 230 (block 512). Thus, the initial authentication check is selectively performed on only those identified UEFI images required for OS deployment (e.g. that are on boot list 250), and only the identification and associated result of the authentication check of these identified UEFI images are stored within ARDS 230.

When the IHS is initially booted up in the unsecured mode, and a subsequent request is received by user input to change from the unsecured boot mode to a secure boot mode, the above described authentication processes of FIG. 4B are triggered, with the checking of the authentication pass/fail status in the ARDs involving only those UEFI images that are included in the boot list 250.

Returning to method 500, at decision block 514, processor 105 determines if a secure boot mode ensuring that all images are authenticated prior to loading the OS, is enabled. In response to the secure boot mode being enabled, processor 105 loads only authenticated images in the boot list 250 to UEFI images 210 of system memory 110 (block 518). Processor 105 triggers OS deployment agent 260 to initiate loading of the OS (block 520) and determines if a user has selected or requested to enable the secure boot mode (decision block 440) (FIG. 4B).

In response to the secure boot mode being not enabled, processor 105 loads all of the images in boot list 250 to UEFI images 210 of system memory 110 (block 516). Processor 105 triggers OS deployment agent 260 to initiate loading of the OS (block 520).

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method for optimizing boot time of an information handling system (IHS), the method comprising:
 a basic input output system (BIOS) dynamically performing an authentication check of drivers within the IHS during an initial boot process of the IHS;
 checking whether a boot up mode of the IHS is set to an optimized boot mode; and in response to the IHS being set to the optimized boot mode:
 identifying unified extensible firmware interface (UEFI) images required for operating system (OS) deployment from among a plurality of UEFI images that includes images not required for OS deployment; and
 storing, within an authentication results data structure (ARDS), an identification of a UEFI image for each driver that is checked, along with a result of the authentication check associated with that driver;
 wherein said dynamically performing the authentication check and said storing comprises selectively performing the authentication check on only those identified UEFI images required for OS deployment and storing only the identification and associated result of the authentication check of the identified UEFI images within the ARDS;
in response to receipt of a subsequent request to enable a secure boot of the IHS, when the initial boot process was performed with the secure boot disabled:
accessing the ARDS to determine if any of the drivers failed its authentication check;
in response to none of the drivers failing its authentication check, continuing the boot process using the authenticated UEFI images of the drivers; and
in response to at least one of the drivers failing its authentication check, outputting a notification indicating a failure of the authentication check by the at least one driver.

2. The computer-implemented method of claim 1, wherein:
the outputting of the notification comprises identifying within the notification which ones of the drivers failed its authentication check; and
the method further comprises initiating one or more actions based on a received user response to the notification.

3. The computer-implemented method of claim 1, wherein performing an authentication check comprises:
accessing each of the drivers and retrieving a certificate from each driver that has a certificate;
determining if a retrieved certificate of a driver is valid; and
identifying each driver that does not have a certificate and each driver whose retrieved certificate is not valid as a driver that fails authentication.

4. The computer-implemented method of claim 3, further comprising:
generating a hash to be utilized as the identification of a UEFI image corresponding to the driver;
storing the hash within the ARDS; and
associating the result of the authentication check for the driver with the hash within the ARDS.

5. The method of claim 1, further comprising:
in response to completion of the authentication check of the drivers and generating a list of the UEFI images and associated result when a secure boot is not enabled, triggering an operating system (OS) deployment agent to initiate installation of an OS.

6. The method of claim 5, further comprising:
in response to secure boot being enabled:
performing the check of the UEFI images from the ARDS to identify whether any of the UEFI images failed authentication;
in response to none of the UEFI images failing authentication, loading only the authenticated UEFI images; and
triggering the OS deployment agent to install the OS utilizing the authenticated UEFI images.

7. The method of claim 5, further comprising:
in response to secure boot being disabled:
loading all of the UEFI images; and
triggering the OS deployment agent to install the OS.

8. The method of claim 5, further comprising:
prompting for a user selection of an option from a group of options comprising: disabling secure boot; and re-starting the boot process.

9. The method of claim 8, further comprising:
receiving a user selection from among disabling secure boot and re-starting the boot process; and
in response to the received user selection being to disable secure boot, triggering the OS deployment agent to install the OS in a non-secured environment.

10. An information handling system (IHS) comprising:
a processor;
a memory communicatively coupled to the processor via a system interconnect, the processor having firmware executing thereon to enable optimizing boot time of the IHS, wherein the firmware configures the processor to:
dynamically perform an authentication check of drivers within the IHS during an initial boot process of the IHS via a basic input output system (BIOS);
check whether a boot up mode of the IHS is set to an optimized boot mode; and in response to the IHS being set to the optimized boot mode:
identify unified extensible firmware interface (UEFI) images required for operating system (OS) deployment from among a plurality of UEFI images that includes images not required for OS deployment; and
store, within an authentication results data structure (ARDS), an identification of a UEFI image for each driver that is checked, along with a result of the authentication check associated with that driver;
wherein said dynamically performing the authentication check and said storing comprises selectively performing the authentication check on only those identified UEFI images required for OS deployment and storing only the identification and associated result of the authentication check of the identified UEFI images within the ARDS;
in response to receipt of a subsequent request to enable a secure boot of the IHS, when the initial boot process was performed with the secure boot disabled:
access the ARDS to determine if any of the drivers failed its authentication check;
in response to none of the drivers failing its authentication check, continue the boot process using the authenticated UEFI images of the drivers;
and in response to at least one of the drivers failing its authentication check, output a notification indicating a failure of the authentication check by the at least one driver.

11. The information handling system of claim 10, wherein the outputting of the notification includes the firmware further configuring the processor to:
identify within the notification which ones of the drivers failed its authentication check; and
initiate one or more actions based on a received user response to the notification.

12. The information handling system of claim 10, wherein performing an authentication check includes the firmware further configuring the processor to:
access each of the drivers and retrieving a certificate from each driver that has a certificate;
determine if a retrieved certificate of a driver is valid; and
identify each driver that does not have a certificate and each driver whose retrieved certificate is not valid as a driver that fails authentication.

13. The information handling system of claim 10, wherein the firmware further configures the processor to:
generate a hash to be utilized as the identification of a UEFI image corresponding to the driver;
store the hash within the ARDS; and
associate the result of the authentication check for the driver with the hash within the ARDS.

14. The information handling system of claim 10, wherein the firmware further configures the processor to:

check whether a boot up mode of the IHS is set to an optimized boot mode; and in response to the IHS being set to the optimized boot mode:
 identify UEFI images required for operating system (OS) deployment; and
 wherein in dynamically performing the authentication check and said storing, the processor selectively performs the authentication check on only those identified UEFI images required for OS deployment and stores only the identification and associated result of the authentication check of the identified UEFI images within the ARDS.

15. The information handling system of claim 10, wherein the firmware further configures the processor to:
 trigger an operating system (OS) deployment agent to initiate installation of an OS, in response to completion of the authentication check of the drivers and generating a list of the UEFI images and associated result when secure boot is not enabled.

16. The information handling system of claim 15, wherein the firmware further configures the processor to:
 in response to secure boot being enabled:
  perform the check of the UEFI images from the ARDS to identify whether any of the UEFI images failed authentication;
  in response to none of the UEFI images failing authentication, load only the authenticated UEFI images; and
  trigger the OS deployment agent to install the OS.

17. The information handling system of claim 15, wherein the firmware further configures the processor to:
 in response to secure boot being disabled:
  load all of the UEFI images; and
  trigger the OS deployment agent to install the OS.

18. The information handling system of claim 15, wherein the firmware further configures the processor to:
 prompt for a user selection of an option from a group of options comprising: disabling secure boot; and re-starting the boot process.

19. The information handling system of claim 15, wherein the firmware further configures the processor to:
 receive a user selection from among disabling secure boot and re-starting the boot process; and
 in response to the received user selection being to disable secure boot, trigger the OS deployment agent to install the OS in a non-secured environment.

* * * * *